D. A. WHITNEY.
INHALING APPARATUS.
APPLICATION FILED OCT. 20, 1913.
1,132,138.
Patented Mar. 16, 1915.
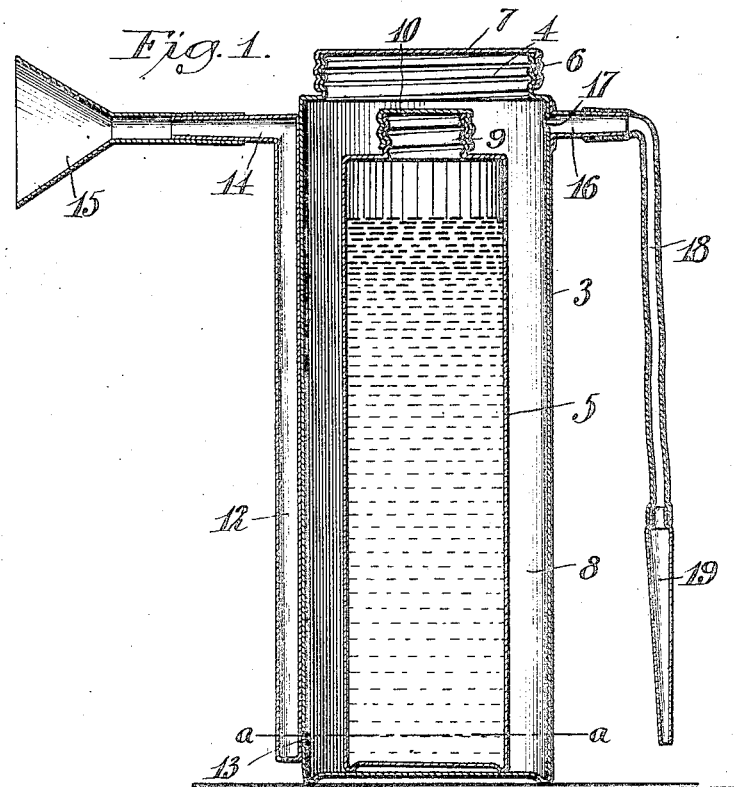
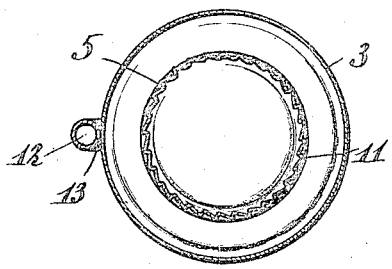
Witnesses:
Jacob Oberst, Jr.
Eda M. Schweiger.
Dennis A. Whitney, Inventor,
By Emil Keulah
Attorney.

UNITED STATES PATENT OFFICE.

DENNIS A. WHITNEY, OF HOLLAND, NEW YORK.

INHALING APPARATUS.

1,132,138.　　　　Specification of Letters Patent.　　Patented Mar. 16, 1915.

Application filed October 20, 1913. Serial No. 796,240.

*To all whom it may concern:*

Be it known that I, DENNIS A. WHITNEY, a citizen of the United States, residing at Holland, in the county of Erie and State of New York, have invented certain new and useful Improvements in Inhaling Apparatuses, of which the following is a specification.

My invention relates to improvements in an inhaling apparatus, and its primary object is to provide an improved device of this type whereby the air entering the same is freed of moisture and escapes therefrom in a dry state, the apparatus being therefore termed a "dry air inhaler."

Other objects are to provide a simple and effective apparatus of this kind for the treatment of certain diseases or ailments, which can be easily manipulated and which is durable in construction and inexpensive to manufacture.

To these ends the invention consists in the novel features of construction and in the combination and arrangement of parts to be hereinafter described and more particularly pointed out in the subjoined claims.

In the drawings,—Figure 1 is a central vertical section of the apparatus. Fig. 2 is a cross section taken on line *a—a*, Fig. 1.

In these drawings the reference numeral 3 designates an outer casing, herein shown as cylindrical in formation but which may be of any other desired cross sectional shape. This casing has an opening 4 in its top to permit the insertion thereinto of a second casing 5, said second casing being of somewhat smaller diameter and being adapted to rest upon the bottom of the casing 3. The opening 4 is formed by forming a threaded neck 6 on the top of the casing 3 and in order to close said opening a cap 7 is threaded onto said neck.

The casing 5 being of smaller diameter than the casing 3 in which it is placed, is separated from the latter by an annular intervening air space 8, and said casing 5 is also provided with a threaded neck 9 to form an opening which is closed by a cap 10. The interior casing 5 is adapted to receive ice, ice water or any other cooling agency capable of maintaining the temperature within the casing 3 lower than the exterior air which is adapted to enter the casing 3 at a low point and rise in contact with the interior or cooling casing so as to escape from said exterior casing at a high point, and in order that the inner casing may present the maximum cooling surface to the rising air, the wall of the same is corrugated, as at 11.

Secured to the side of the outer casing is a vertically-disposed tube 12 having communication with the interior of said casing near its bottom by means of an air passage 13, and to the upper end of said vertical tube, which is bent outwardly at a right angle, as at 14, is applied a funnel 15.

To the outer casing near its upper end is secured a nipple 16 having communication with the interior of said casing by an outlet opening 17, and to said nipple is secured a flexible or other tube 18 having a nozzle 19 applied to its outer or free end which may be used as a nasal or mouth piece.

The air drawn into the casing through the funnel 15 and tube 12 enters said casing at a low point and occupies the annular space 8 between the outer and inner casing, and in passing upwardly in said annular space the moisture is condensed therefrom by the cooling action of the cooling agency within the inner casing, which inner casing may therefore be termed a "condenser," the air escaping in dry form from the nozzle 19 to be used for the treatment of certain ailments or diseases.

If it is found that the air drawn into the casing is not of sufficiently high temperature to cause proper condensation when coming in contact with the condenser, the funnel may be placed in close proximity to a lamp or any other heating medium so that when the air enters the casing it will come in contact with a considerably cooler area, and thus assure condensation so as to escape from the apparatus in a dry state.

By arranging the funnel 15 at a high point and directing the air downwardly through the tube 12 to the passage 13, provision is made for placing any suitable heater directly beneath the funnel so that the hot air rising from the heater passes directly into the funnel when drawing upon the nozzle 19. Moreover, by introducing air at a low point of the casing and condensing the same in its passage upwardly through the casing the moisture adhering to the condenser within the casing flows to the bottom of the latter. In this manner there are no accumulations of moisture or water at the air outlet of the casing and the air may escape in absolutely dry form which would be impossible if the arrangement of air inlet and air outlet were otherwise.

Having thus described my invention, what I claim is,—

1. An inhaler comprising a casing having an air inlet at a low point, means for conducting air to said inlet from a high point and an air outlet at a high point, a treating element connected to said air outlet, and means for condensing the moisture from the air in passing through said casing.

2. An inhaling apparatus comprising a casing, a tube extending upwardly from a point near the bottom of said casing and having communication with the interior of said casing near its lower end, said casing having an outlet near its upper end, and a second casing within said first-mentioned casing containing a cooling medium.

3. In an inhaling apparatus, the combination with a casing having a vertically-disposed tube extending from a point near its bottom to a point near its upper end, said tube having its upper end directed outwardly, a funnel attached to said outwardly directed upper end, said tube being in communication at the lower end with the lower end of said casing and said casing having an outlet at its upper end, and a second casing within said outer casing spaced from the wall of the latter.

4. An inhaling apparatus comprising a casing having a large opening at its upper end, an air inlet at its lower end and an air outlet near its upper end, a closure for said opening, and an inner casing inserted into said outer casing through said opening and containing a cooling medium, said inner casing being spaced from the wall of said outer casing by an annular intervening space.

In testimony whereof I affix my signature in presence of two witnesses.

DENNIS A. WHITNEY.

Witnesses:
CHARLES WAGNER,
WM. L. WAGNER.

Copies of this patent may be obtained for five cents each, by addressing the "Commissioner of Patents, Washington, D. C."